(12) United States Patent
Ohkawa

(10) Patent No.: US 7,394,107 B2
(45) Date of Patent: Jul. 1, 2008

(54) LIGHT GUIDE PLATE, SURFACE LIGHT SOURCE DEVICE AND DISPLAY

(75) Inventor: Shingo Ohkawa, Koshigaya (JP)

(73) Assignee: Enplas Corporation, Sitama (JP)

( * ) Notice: Subject to any disclaimer, the term of this patent is extended or adjusted under 35 U.S.C. 154(b) by 120 days.

(21) Appl. No.: 11/270,623

(22) Filed: Nov. 10, 2005

(65) Prior Publication Data

US 2006/0091413 A1   May 4, 2006

(51) Int. Cl.
*H01L 33/00* (2006.01)

(52) U.S. Cl. ............................. 257/98; 257/99; 362/619; 362/625

(58) Field of Classification Search .................... 257/82, 257/88, 90, 91, 94, 95, 96, 97, 98, 99, E51.022, 257/E33.001, E33.067, E31.099; 362/26, 362/51, 333, 346, 619, 625; 349/65; 359/599; 385/901
See application file for complete search history.

(56) References Cited

U.S. PATENT DOCUMENTS 6,485,157 B2   11/2002   Ohkawa

FOREIGN PATENT DOCUMENTS

| JP | 5-127157 | 5/1993 |
| JP | 9-113907 | 5/1997 |
| JP | 10-2064849 | 8/1998 |
| JP | 11-7014 | 1/1999 |
| JP | 11-102609 | 4/1999 |
| JP | 11-149074 | 6/1999 |
| JP | 11-353916 | 12/1999 |
| JP | 2000-98383 | 4/2000 |

OTHER PUBLICATIONS

Japanese Patent Office Action, mailed Dec. 18, 2007 and issued in corresponding Japanese Patent Application No. 2000-202350.

*Primary Examiner*—Hoai v Pham
*Assistant Examiner*—DiLinh Nguyen
(74) *Attorney, Agent, or Firm*—Staas & Halsey LLP

(57) ABSTRACT

A guide plate has a back face provided with a great number of micro-reflectors which has a guide portion and a conversion output portion including a valley. The conversion output portion reflects twice input light P at inner slopes, generating inner output light Q directed obliquely as to be distant from an incidence end face. Inner output light Q is inner-incident to a slope of projection row PR on an emission face, with the result that some of the inner-incident light becomes a direct escaping light and much of the other reaches the emission face again after travelling along various paths. At the second time or later chances of escaping, an actual escaping occurs to generate an indirect escaping light. A mixed emission suitably blended of the direct and indirect light is directed to directions, which are modified to directions around a roughly frontal direction by prism sheet PS before being supplied to a LCD panel or the like to be illuminated. Blending of direct/indirect escaping light prevents fine brightness unevenness from appearing. Reflector RF, if arranged, brings an increased indirect escaping light. An emission has travelling directions inclinations of which are controlled while fine brightness unevenness are reduced.

27 Claims, 12 Drawing Sheets

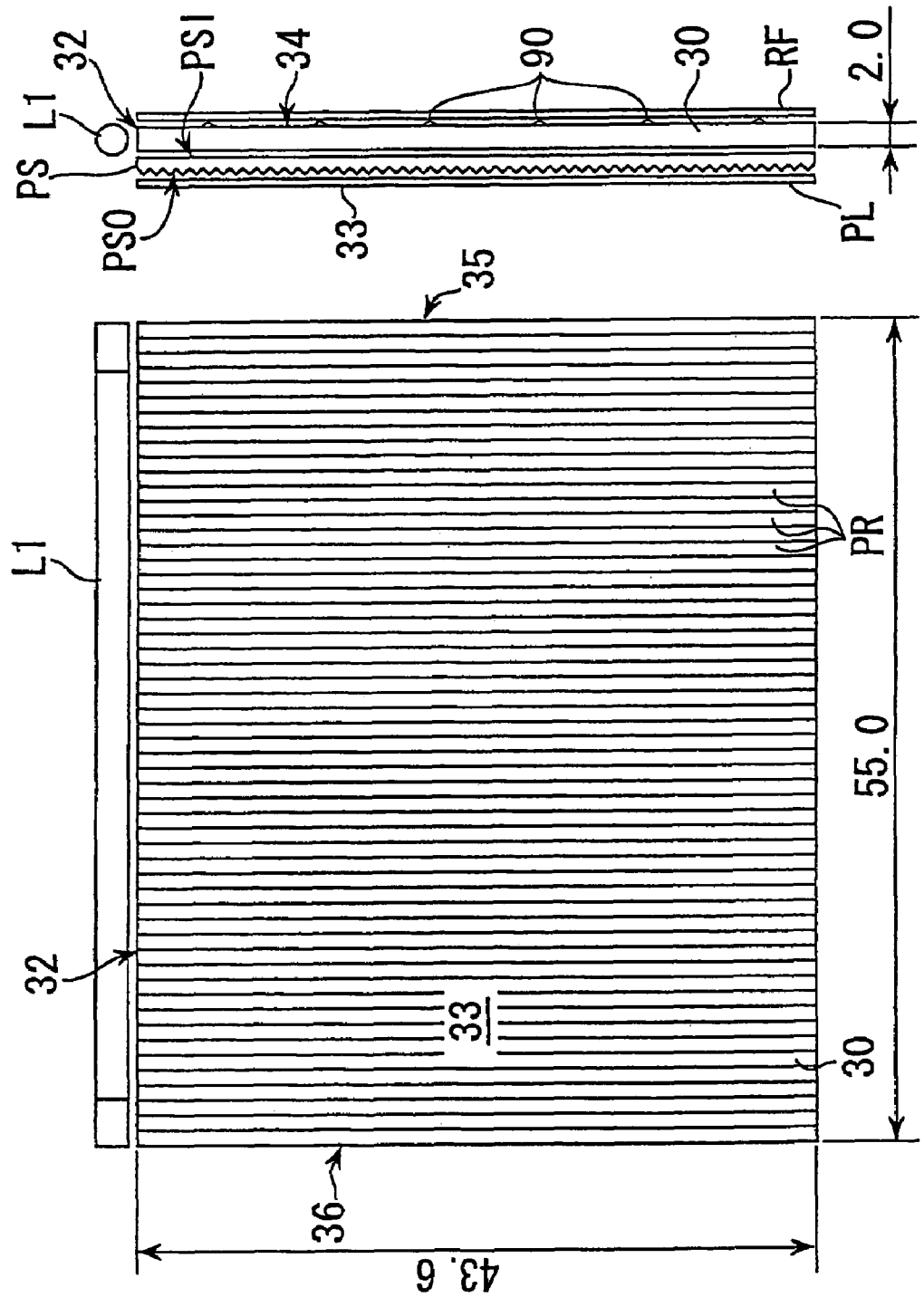

LIGHT GUIDE PLATE, SURFACE LIGHT SOURCE DEVICE AND DISPLAY

CROSS REFERENCE TO RELATED APPLICATIONS

This application is based on and hereby claims priority to U.S. application Ser. No. 09/893,444 filed on Jun. 29, 2001, the contents of which are hereby incorporated by reference.

BACKGROUND OF THE INVENTION

1. Field of the Invention

The present invention relates to a light guide plate which is supplied with light sideways and direction-converts the supplied light inside to output an oblique emission, to a surface light source device employing the light guide plate and a direction modifying element in combination and to a liquid crystal display employing the surface light source device for illumination a liquid crystal display panel.

2. Description of the Related Art

A well-known technique employs a light guide plate having an incidence end face provided by a side end face and an emission face provided by one of two major faces (i.e. faces larger than end faces), wherein light is introduced into the light guide plate through incidence end face. A light guide plate used in such a way is applied to a surface light source device, which is employed for various uses such as backlighting for a liquid crystal display. Surface light source devices of such a type are subject to a basic performance depending greatly on light guide plates employed therein.

A basic function of a light guide plate is to change a propagation direction (roughly in parallel with an emission face of the light guide plate) of light introduced into the light guide plate through a side end face so that the light is emitted through the emission face. As known well, a simply transparent light guide plate without any modification is capable of deflecting light a little, providing a unsatisfactory brightness. Consequently, any means for promoting emission through the emission face is required.

In general, means for promoting emission relies upon one of the followings or some of them as combined: (1) Scattering power within a light guide plate (light scattering guide plate); (2) Emission face (a major face) provided with light diffusibility; (3) Back face provided with light diffusibility; (4) Emission face provided with light-refractive unevenness; and (5) Back face provided with light-refractive unevenness.

Ways based on (1) provide uniform and highly effective emission with ease. However, the emission is directed to a preferential direction much inclined with respect to a frontal direction. Usually, the inclination is about 60 to 75 degrees to a normal with respect to the emission face. Further to this, a main beam is accompanied by a remarkable quantity of light that propagates almost along the emission face.

An direction modifying element (prism sheet) is capable of direction-modifying from the inclined direction to the frontal direction. However, the light propagating almost along the emission face is hardly direction-modified.

Ways based on (2) or (3) scarcely provide a highly effective emission. The emission is also preferentially directed to oblique directions as in the case of (1). An increased light diffusibility checks the efficiency because of factors such as wide range scattering or absorption by light scattering elements (for example, by a white ink).

Although ways based on (4) are capable of causing light to escape from the emission face with ease, positive direction conversions are less effected. Accordingly, emission with a high efficiency is less expected. In particular, it is not advantageous that they fail to generate light rays which travel from the back face to the emission face.

To the contrary, ways based on (5) positively generate light which travels from a back face to an emission face of a light guide plate, being free from wide range light scattering.

FIG. 1a to FIG. 1c illustrate examples based on the above (5). Referring to the figures, reference number 1 indicates a light guide plate made of a transparent material such as acrylic resin, the plate having a side end face to provide an incidence end face 2. A primary light source L is disposed beside the incidence end face 2 to be supplied with light from the primary light source L. One of two major faces 3 and 4 of the light guide plate 1 provides an emission face 3. The other major face (called "back face") is provided with a great number of recesses 5 having a cross section including slopes 5a and 5b.

The primary light source L emits light which is introduced into the light guide plate 1 through the incidence end face 2. Upon encountering a recess, a propagation light within the light guide plate 1 (as represented by G1, G2) is inner-reflected by a slope 5a to be directed to the emission face 3. Inner-incidence angle is denoted by θ and emission beams derived from beams G1, G2 are denoted by G1', G2'. In other words, the slope 5a, which is relatively near to the incidence end face 2 (or primary light source L) compared with the other slope 5b, provides an inner-reflection slope for direction conversion. This effect is sometimes called edge-lighting effect.

The recesses 5 are formed like dots or linear channels. As shown in FIG. 1a to FIG. 1c, formation pitch d, depth h or slope inclination φ of the recesses 5 is varied depending on distance from the incidence end face 2. Such variations prevent brightness on the emission face 3 from varying depending on distance from the incidence end face 2.

However, prior arts as shown in FIG. 1a to FIG. 1c are subject to the following problems.

1. Less light reaches a region behind the slope 5b as viewed from the incidence end face 2. Therefore, a reduced pitch d hardly rises direction conversion efficiency and the emission face 3 is apt to show an unevenness in brightness.

2. Sufficient direction control in a plane parallel to the incidence end face 2 is not effected. For instance, if beams G1 and G2 are parallel to the emission face 3 but not perpendicular to the incidence end face 2, emission beams G1' and G2' will be diverged to the right or left as viewed from the incidence end face 2. Actually, there is considerable light components which propagate not perpendicularly with respect to the incidence end face 2 within the light guide plate 1. Accordingly, it is difficult to provide an emission to a desirable angle or within a desirable angle range spatially (i.e. in both planes parallel and vertical to the incidence end face 2).

3. Light leaking through the back face 4 occurs easily because direction conversion for generating light directed to the emission face 3 relies upon once-occurring-reflection (at slope 5a). That is, the condition for total reflection is broken with ease at the reflection for direction conversion. For instance, if beams G1' and G2' are required to be directed to approximately frontal directions, inner-incidence angle θ is set at about 45 degrees. This is roughly the same as the critical angle for an interface between air and acrylic resin which is a typical material. Therefore, a considerable part of light propagating slightly downward leaks through the slope 5a.

The present inventor proposed a light guide plate and surface light source device/LCD employing the light guide plate, which were disclosed Japanese Patent Application Tokugan-Hei 11-38977. A brief explanation of the proposed technique is as follows, being aided by FIG. 2 and FIGS. 3a, 3b.

FIG. 2 is a plan view showing an arrangement of a surface light source device as viewed from a back side of a light guide plate arranged therein, the arrangement being disclosed in the above-mentioned patent application.

FIG. 3a is a partially enlarged perspective view of the light guide plate employed in the surface light source device shown in FIG. 2, and FIG. 3b is a partially enlarged view of one of projection-like micro-reflectors formed on a back face of the light guide plate. Note that sizes of micro-reflectors are exaggerated for the sake of explanation.

Referring to FIG. 2, a light guide plate 10 made of a transparent material. The light guide plate 10 has an end face (minor face) to provide an incidence end face 12. A back face referenced with numeral 14 is a back face provided by one of major faces. The other major faces provides an emission face (See FIG. 3a). The light guide plate 10 has right and left side end faces (minor faces) 15 and 16.

A rod-like primary light source (cold cathode lamp) L is disposed along the incidence end face 12 which is supplied with light from the light source. Both ends of the cold cathode lamp L are electrode portions EL1 and EL2 between which a light emitting portion extends with a length somewhat smaller than that of the incidence end face 12. Such a design is often employed in order to avoid the electrode portions EL1, EL2 from sticking out.

According to a basic feature of the technique disclosed in the above patent application, a great number of projections 20 are formed on the back face 14. The primary light source L emits light which is introduced into the light guide plate 10 through the incidence end face 12. An inner propagation light travels within the light guide plate 10 and is reflected generally twice when entering into one of the micro-reflectors 20, with the result that a light directed to the emission face 13 is produced. That is, the micro-reflectors function as "direction-conversion means for converting an input light into an inner output light".

As shown in FIGS. 3a and 3b, each of the micro-reflectors 20 is configured as to be projected from a general plane (level plane) representative of the back face 14. The illustrated micro-reflector 20 has a shape like a projection having six faces 21, 22, 23, 24, 27 and 28. Note that, in the instant description, "general level plane representative of a back face" is called "first general plane" and "general level plane representative of an emission face" is called "second general plane".

The faces 21 and 22 provide a guiding portion to effect a smooth light input for direction-conversion. The faces 21 and 22 meet each other at a ridge portion 26. On the other hand, the faces 23 and 24 effect reflections twice for direction-conversion, producing an inner output light. The faces 23 and 24 meet each other at a ridge portion 25. The faces 27 and 28 are side walls limiting width of the micro-reflector.

An orientation of each micro-reflector is represented by an extending direction of the ridge portion 25. In the illustrated example, the ridges 25 and 26 have a straight-projection-line provided by "projecting them onto the first general plane". Arraying of the micro-reflectors is designed so that they align to directions corresponding to light coming directions, respectively, in order to rise input efficiency and direction-conversion efficiency.

A great part of input light represented by beams H1, H2 is incident to the incidence end face 12 in a direction approximately perpendicular to the incidence end face 12. However, light that is actually inputted into the projections is not precisely parallel to the first general plane but progresses somewhat downward (as to approach the back face 14).

Light that progresses precisely parallel to the first general plane or approaches the emission face 13 advances deep without being inputted to projections 20. Consequently, the projections 20 do not obstruct light advancing and give no region little light reaches, thereby effecting contrary to recesses (See shown FIG. 1).

Viewing from the standpoint of the beams H1 and H2, the reflection faces 23 and 24 of the conversion output portion configurate a valley getting tapered forward. The ridge 25 corresponds to a bottom of the valley. The valley gets narrower and shallower according to distance from the guide portion. Therefore, a great part of light H1 and H2 entering the valley via the guide portion is inner-reflected by one of the reflection faces 23 and 24, and then inner-reflected again by the other faces 24 or 23.

As a result, a light propagation direction is converted twice three-dimensionally to produce inner output light J1, J2 directed to the emission face 13. The inner output light J1, J2 produce in such a way is emitted from the emission face 13 and used for illuminating an object such as LCD panel. Various variations of arrangement and orientation of the micro-reflectors 20 are allowed. The example shown in FIG. 2 is subject to the following rules.

1. Formation density (covering rate) tends to increase according to distance from the incidence end face 12. This prevents brightness on an emission face from varying depending on distance from the incidence end face 12.

2. Micro-reflectors 20 are arranged in corner areas A, B near to the electrode portions EL1, EL2 at a specially large density. This prevents, together with orientation of the following item 4, prevents dark areas corresponding to the areas A, B from emerging on the emission face.

3. Micro-reflectors 20 are orientated so as to be approximately vertical to the incidence end face 12 almost over the back face 14, with their guide portions being directed to the incidence end face 12. In other words, each micro-reflector 20 is orientated so that its conversion output portion has a ridge 25 which extends approximately at the right angle with respect to the incidence end face 12.

4. In the corner areas A, B, micro-reflectors 20 are much obliquely orientated with respect to incidence end face 12, with guide portions being directed to the light emitting portion of the cold cathode lamp L. This causes these micro-reflectors 20 to be orientated as to be corresponding to light coming directions, thereby rising direction conversion efficiency.

5. In both side edge portions 15, 16 except the corner areas A and B, micro-reflectors 20 are orientated so as to be inclined at small angles with respect to the incidence end face 12, with guide portions being directed to the light emitting portion of the cold cathode tube L. This causes these micro-reflectors 20 to be orientated corresponding to light coming directions, as the above item 4, thereby rising direction conversion efficiency. If conversion output portions (directions of inner reflection faces 23 and 24) of micro-reflectors 20 located in a certain range from both side end faces 15 and 16 are designed the so that an inner output light is inclined toward a center portion of the light guide plate 10, an emission with converging property is produced.

6. Micro-reflector arrangement does not have a striking regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

It is possible to heighten the performance of a light guide plate and surface light source device/LCD employing the light guide plate, which were disclosed in the above propose, by adding contrivances as above.

However, the above-proposed technique remains a problem unsolved. That is, the proposed technique, if applied, a fine unevenness in brightness appears on the emission face of the light guide plate 10 corresponding to the size and arrangement pitch of the micro-reflectors 20. This gives a viewer a non-smooth visual feeling (a feeling of glaring).

This problem is supposed to arise due to a fact that a roughly almost of the inner output light of the micro-reflectors 20 escapes and is emitted from the emission face at the first chance with ease, as mentioned with referring to FIGS. 3a and 3b. In the instant description, such an escaping (light) at the first chance is called "direct escaping (light)".

Needless to say, such direct escaping processes occur generally corresponding to positions of the micro-reflectors 20. On the other hand, an efficient emission can not be expected in a blank region (a flat region on the flat back face 14) without micro-reflectors 20 among the micro-reflectors. As a result, a fine unevenness in brightness appears on the emission face.

In the instant description, the term "indirect escaping" or "indirect escaping light" means a phenomena or escaping light which occurs or generates at second or later chances after being inner-reflected by the emission face. Simply saying, if the direct escaping light is produced to much as compared with the indirect escaping light, a fine unevenness in brightness will appear.

This problem will be relaxed to a degree by arraying the micro-reflectors 20 at a high density. However, arraying density is subject to a practical limit.

SUMMARY OF THE INVENTION

The present invention solves problems which are involved in the technique of the above proposition. An object of the present invention is to provide a light guide plate which is improved not only as to have a superior direction-conversion function for light introduced sideways but also as to have an emission face on which finely irregular brightness hardly appears.

Another object of the present invention is to provide a surface light source device which effectively gives a high-quality illumination output almost free from finely irregular brightness by means of the improved light guide plate.

Still another object of the present invention is to provide a liquid crystal display which shows a high-quality display function by applying the improved surface light source device for illumination a liquid crystal display panel.

The present invention realizes the above objects by forming a great number of projection rows, which diversifies routes of emission, on an emission face of a light guide plate that is employed in the above proposed idea (of the above patent application) based on direction-conversion through inner reflections effected twice by inner surfaces of micro-reflectors.

In the first place, the present invention improves a light guide plate having two major faces to provide an emission face and a back face, and an incidence end face for introducing light.

According to a feature of the present invention, the back face is provided with a great number of projection-like micro-reflectors for direction-conversion of light, each of which has a guiding portion and a conversion output portion that includes a ridge portion and a pair of first and second reflection surfaces formed on both sides of the ridge portion respectively as to be inclined with respect to a general plane representative of the back face.

Thus the ridge portion and the first and second reflection surfaces form a valley in each of the micro-reflectors, the valley getting narrower and shallower as being distant from the guiding portion.

Further, the valley is formed so that an inner input light reaching the valley via the guiding portion is reflected by one of the first and second reflection surfaces and is further reflected by the other of the first and second reflection surfaces as to produce an inner output light having a main propagation direction that is inclined with respect to a frontal direction in a plane perpendicular to the incidence end face so as to get remote from the incidence end face.

This controls the proportion of direct escaping light to the inner output which is inner-incident to the emission face. Further, the emission face may be provided with a great number of projection rows running approximately at right angles with respect to the incidence end face. This, if employed, further controls the proportion of direct escaping light to the inner output which is inner-incident to the emission face.

The first and second reflection surfaces are preferably different from each other in inclination angle with respect to the general plane representative of the back face. And, the ridge preferably extends in a direction according to a direction distribution that depends on position on the back face. A directional emission distribution of the light emitted from the emission face can be controlled depending on inclinations of the first and second reflection surfaces and on an extending direction distribution of the ridges.

The present invention provides an improved surface light source device which employs a light guide plate as stated above. The present invention improves a surface light source device comprising at least one primary light source, a light guide plate having two major faces to provide an emission face, a back face and an incidence end face for introducing light supplied by the primary light source and a direction modifying member disposed along the emission face.

Corresponding to the above-described feature, the back face of light guide plate is provided with a great number of projection-like micro-reflectors for direction-conversion of light. Each of the micro-reflectors has a guiding portion and a conversion output portion that includes a ridge portion and a pair of first and second reflection surfaces formed on both sides of the ridge portion respectively.

The ridge portion and the first and second reflection surfaces form a valley in each of the micro-reflectors, the valley getting narrower and shallower as being distant from the guiding portion.

Further, the valley is formed so that an inner input light reaching the valley via the guiding portion is reflected by one of the first and second reflection surfaces and is further reflected by the other of the first and second reflection surfaces as to produce an inner output light having a main propagation direction that is inclined with respect to a frontal direction in a plane perpendicular to the incidence end face so as to get remote from the incidence end face.

And the direction modifying member, to which the inner output light is incident after being emitted from the emission face as an input, produces an output light having a main propagation direction which is approximately directed to a frontal direction regarding in a plane perpendicular to the incidence end face.

Since the inner output light is incident obliquely to the emission face, the put to the direction modifying member contains indirect escaping light not a little together with direct escaping light. This tends to lead to a reduced fine brightness unevenness.

Further, the emission face of the light guide plate may be provided with a great number of projection rows running approximately at right angles with respect to the incidence end face. This, if employed, further controls the proportion of direct escaping light to the inner output which is inner-incident to the emission face.

In general, if the proportion of direct escaping light is controlled, an increased quantity of light is inner-reflected without direct escaping. A remarkable part of the inner-reflected light can have a chance of escaping indirectly via various travelling paths. Since there is very poor relation between positions at which indirect escaping occurs and those at which micro-reflectors are located, a conspicuous fine brightness unevenness hardly appears.

Further to this, since a process of direction-conversion includes two steps, "producing of oblique incidence inner output light by means of micro-reflectors" and "producing of frontal output light by means of a direction modifying member", the process is effected less forcibly in comparison with that effected by only a direction modifying member or only micro-reflectors, allowing an increased degree of flexibility in design.

For instance, even if only direction modifying members under limited design conditions are available, it is not difficult to cause the direction modifying members to provide approximately frontal output light by optionally adjusting directions of the first and second reflection surfaces of the micro-reflectors.

It is noted that a reflection member is preferably disposed along the back face of the light guide plate in order to obtain an increased indirect escaping light. The reflection member reflects light which has leaked through the back face after being inner-reflected the projection rows so that the light is returned into to light guide plate and has a chance of indirect escaping.

It is also noted that each ridge of each conversion output portion may extend in a direction which varies depending on position on the back face. The emission from the emission face can have a controlled directional distribution depending on an extending direction distribution of the ridges.

Extending directions of the ridges of the direction conversion output portions may vary depending on position on the back face as to approximately accord with light coming directions. Alternatively, Extending directions of the ridges of the direction conversion output portions may vary depending on position on said back face as to be inclined at a small angle with respect to light coming directions.

Such an improved surface light source device is employable for illuminating a liquid crystal display panel in a liquid crystal display. If so employed, characteristics of the surface light source device are inherited to the liquid crystal display. Therefore, a liquid crystal display in accordance with the present invention provides a display screen which shows a bright image without fine brightness unevenness when viewed from a certain direction or position.

BRIEF DESCRIPTION OF THE DRAWINGS

FIG. 4a is a top plan view of an outlined arrangement of an embodiment in accordance with the present invention;
FIG. 4b is a side view of the outlined arrangement of the embodiment shown in FIG. 4.

DETAILED DESCRIPTION OF THE PREFERRED EMBODIMENT

Figure 5:
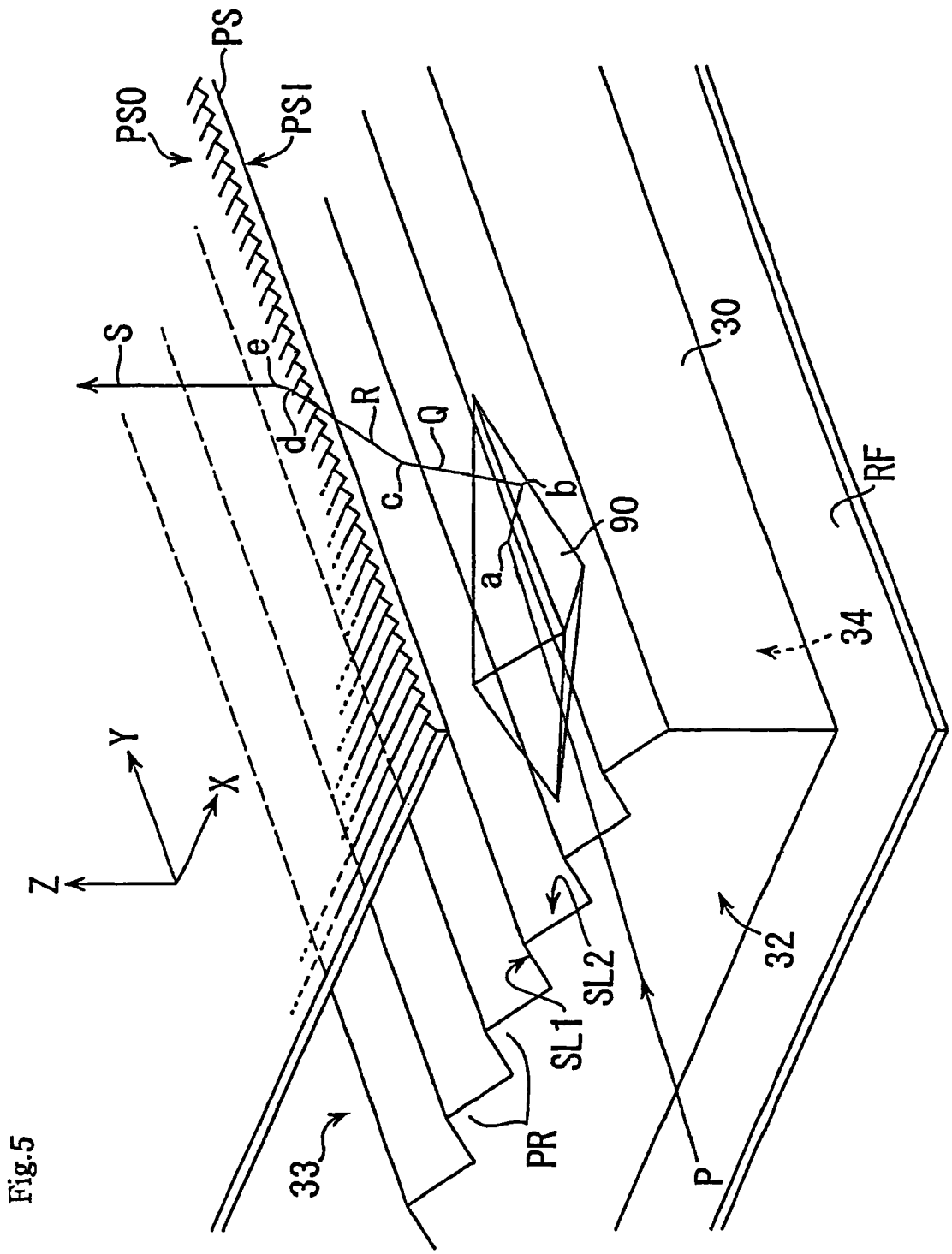
FIG. 5 is an enlarged perspective view illustrating a micro-reflector employed in the same embodiment and around it, wherein a typical light path is depicted together.

An outlined arrangement of an embodiment in accordance with the present invention is illustrated in FIGS. 4a and 4b. FIG. 4a is a top plan view and FIG. 4b is a side view from the left hand in FIG. 4a. FIG. 5 is an enlarged perspective view illustrating a micro-reflector employed in the same embodiment and around it, wherein a typical light path is depicted together.

In FIG. 4a, a prism sheet (direction modifying member) and a LCD panel are not shown. In FIG. 5, the LCD panel is not shown and only a partial illustration of some projection rows of a prismatic surface of the prism sheet is shown in order to give an easy illustration.

Numerals for size indication in mm are merely exemplary ones. It is noted that sizes of micro-reflectors and projection rows are exaggerated as required for giving easy illustrations in figures referred hereafter. A LCD panel PL is a typical example of object to be illuminated, which may be replaced by another object to be illuminated depending on uses.

First, referring to FIGS. 4a and 4b, a light guide plate 30 has a side end face which provides an incidence face 32, wherein the light guide plate 30 is made of a transparent material such as acrylic resin, cycloolefinic resin or polycarbonate (PC). A rod-like primary light source (cold cathode lamp) L1 is disposed along the incidence end face 32 which is supplied with light. End faces extending on the right and left as viewed from the incidence end face 32 provide side faces 35, 36.

One of two major faces 33, 34 of the light guide plate 30 provides an emission face 33. The other face (back face) 34 is provided with a great number of micro-reflector 90. A reflection member RF is disposed along the back face 34. The reflection member RF has a reflection surface facing the back face 34. The reflection surface facing is preferably provided with a diffusible-reflectivity. The reflection member RF may be a white PET film.

Alternatively, the reflection member RF may be made of a material having a regular reflectivity such as silver or aluminum foil. The reflection member RF may not be sheet-like member. For instance, an inner surface of the frame supporting the light guide plate 30 and other elements may provide a reflection surface.

Referring to FIGS. 4 and 5 together, the emission face 33 is provided with a great number of projection rows PR extending in a direction approximately perpendicular to the incidence end face 32. A prism sheet PS as a direction modifying member is disposed at the outside of the emission face 33. The prism sheet PS has, as known well, a prismatic surface having a great number of projection rows each of which is shaped like a triangle.

In the illustrated arrangement, the prism sheet PS is orientated so that the prismatic surface provides an output face PSO of the prism sheet. The other face of the prism sheet PS provides a flat input face PSI. According to an alternatively employable inverse orientation, the prismatic surface provides an input face and the other face provides a flat output face.

A well-known LCD panel PL is disposed as to face the output face PSO. It is noted that a diffusion plate, protection sheet or the like having a weak light scattering ability may be disposed additionally along the emission face 33. If so arranged, the diffusion plate would be disposed either between the prism sheet PS and the LCD panel PL or between the prism sheet PS and the emission face 33. And, the protection sheet would be disposed, in usual cases, at the most outside position (i.e. just before the LCD panel PL).

In FIG. 5, beam P represents the light emitted by the primary light source L1. Beam P is introduced into the light guide plate 30 through the incidence end face 32 to propagate within the light guide plate 30, entering into any micro-reflector 90 to become an input light (input beam). Input beam P is reflected in the micro-reflector 90 generally twice (points a and b) to generate an inner output light Q directed toward the emission face 33.

It is important that the inner output light Q has a main propagation direction which is inclined with respect to a frontal direction in a plane perpendicular to the incidence end face 32 as to be distant from the incidence end face 32. This causes inner incidence angles to the emission face 33 to be increased as compared with a case where the above inclination is absent. That is, smaller angles with respect to the emission face 33 are obtained.

This situation is maintained in a similar way even if the emission face 33 is not provided with the projection rows (slopes SL1, SL2). In general, as known in the art of fundamental optics, the greater is inner incidence angle (namely, the greater is angular deviation from a vertical incidence or the smaller is an incidence angle with respect to an interface), the smaller is escaping coefficient from the medium (light guide plate 30) to the ambient air.

Accordingly, although the present invention includes some cases where no projection row PR (slopes SL1, SL2) is formed, it is noted that projection row PR (slopes SL1, SL2) enables a direct escaping light to be controlled easily as to be decreased.

It is noted that an inner output light Q reaches either a slope SL1 or SL2 of any one of the projection rows PR, if they employed as shown in the illustrated arrangement. Some of the reaching light escapes from the light guide plate 30 (point c) to become an input light (direct escaping component) R to the prism sheet PS depending of inner incidence angle at the inner incidence to the slope SL1 or SL2.

The other component is inner-reflected a remarkable part of which reaches the emission face 33 again after undergoing various path travels. Thus second or later time chances of escaping from the emission face 33 are produced. Indirect escaping light generated at these second or later time chances is also included in the input light R to the prism sheet.

The projection rows PR formed on the emission face 33 have a function to control the sharing rate between direct escaping light and indirect escaping light. It is noted again that direct escaping light can be modified as to be reduced even if no projection row PR is formed on the emission face 33 as mentioned above.

Indirect escaping light reaches the emission face 33 after traveling through various paths. Therefore, the probability that both indirect escaping light and direct escaping light escape at one position is low. As a result, escaping positions of the whole emission are dispersed on the emission face 33, leading to little fine unevenness in brightness.

Some light returns to the back face after being inner-reflected by a slope SL1 or SL2 of a projection PR formed on the emission face 33, a remarkable part of the returned light once leaking through the back face 34. The reflection member RF returns this leaking light to the light guide plate 30 to give again chances of indirect escaping from the emission face 33.

Accordingly, it is very preferable to dispose a reflection member RF along the back face 34 for providing an increased indirect escaping light. It should be noted, however, that indirect escaping light is obtained to some extent even if the reflection member RF is omitted.

Light R containing both indirect escaping light and direct escaping light is obliquely incident to the input face (flat face) PSI of the prism sheet PS. The prism sheet PS produces an output light S having a direction which is modified according to a well known effect. That is, light R advances straight within the prism sheet PS after being refracted at an incidence (See reference d) and is refracted again at an outputting (See reference e) to become an output light S.

It is possible to cause the output light S to be directed to an approximately frontal direction by choosing in design a suitable prismatic vertical angle of prism cut on the prismatic surface PSO under considering refractive index of the prism sheet PS. If an alternative arrangement in which the prism sheet PS is turned over and light is inputted through the prismatic surface is employed, an output light S is produced through being refracted at one of slopes of a prismatic surface, the ion, being inner-reflected at the other slope and being refracted at an outputting from the flat face.

It should be noted that slight direction changes are caused at inputting and outputting and a direction change contributory to direction modifying is caused at inner-reflection.

If the prism sheet PS is subject to any limitation on design (for example, a predetermined prismatic vertical angle of prism cut), directions of tow reflection surfaces of each micro-reflector 90 can be chosen so that the output light S is directed to an approximately frontal direction.

Thus the present invention has a merit that both prism sheet PS and micro-reflector 90 have degrees of flexibility if a frontal illumination output is required.

The LCD panel PL (See FIG. 4b) is supplied with the output light S. This light contributes to display operation according to a well-known principle. The illumination output having little fine unevenness in brightness is contributory to causing the LCD panel, supplied with the illumination output, to have a high quality display screen.

Figure 3A:
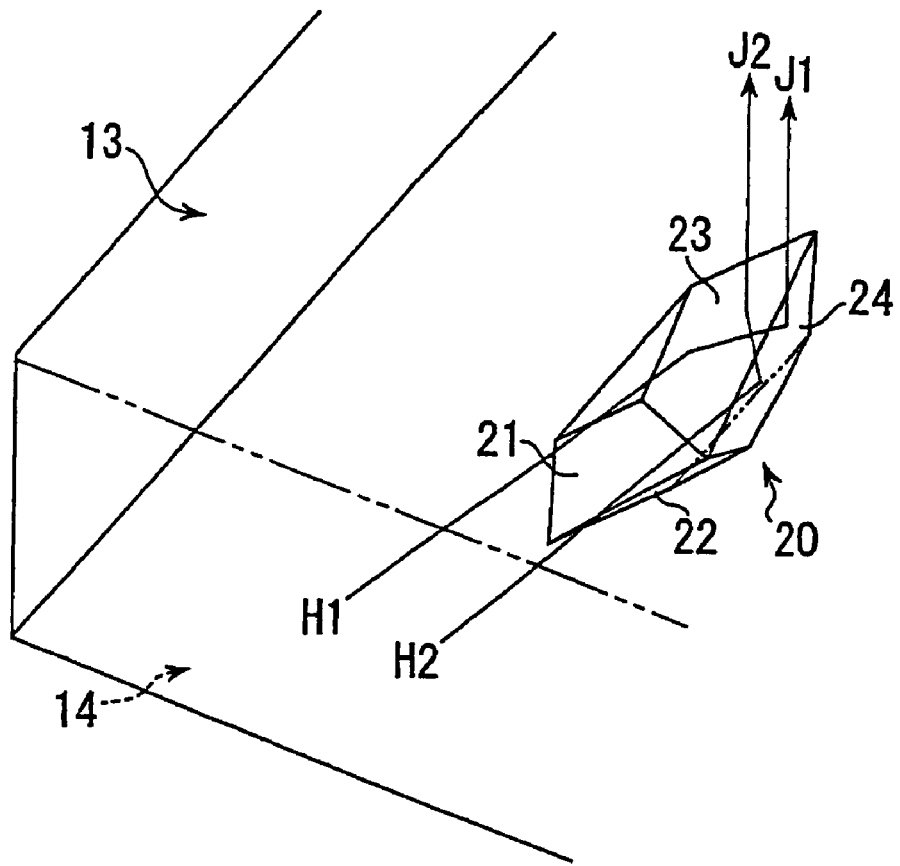
FIG. 3a is a partially enlarged perspective view of the light guide plate employed in the device shown in FIG. 2.
Figure 3B:
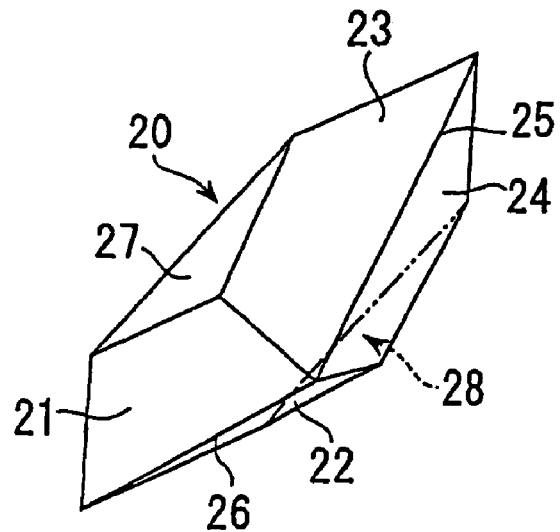
FIG. 3b is an enlarged illustration of one of the projection-like micro-reflectors formed on the back face of the same light guide plate.
Figure 6:
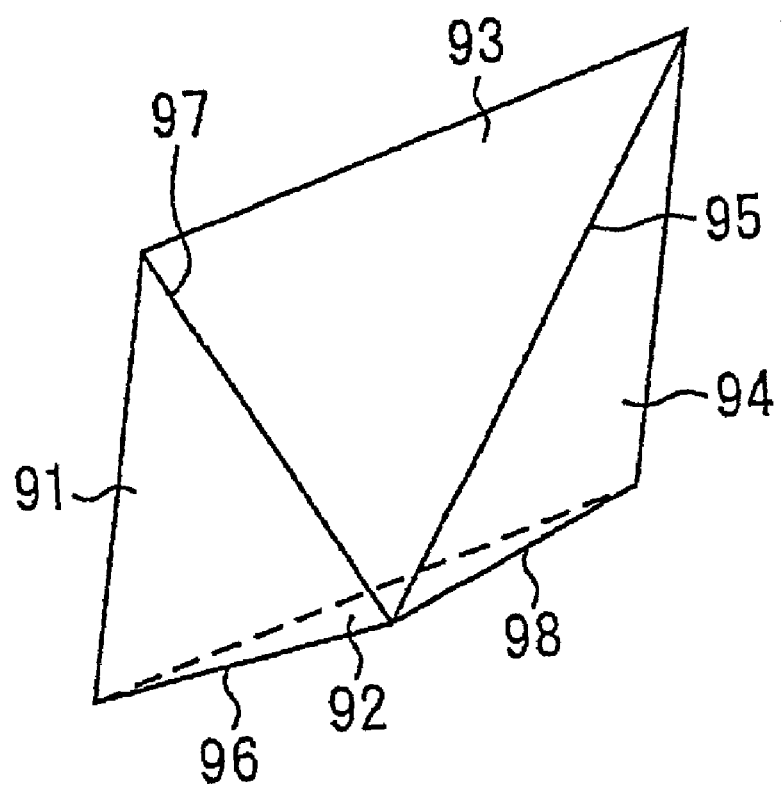
FIG. 6 is an enlarged perspective view illustrating one of micro-reflectors employed in the same embodiment.

Each micro-reflector 90 employed in this embodiment has a shape like that shown in FIG. 3*b*. FIG. 6 is an enlarged perspective view illustrating a micro-reflector.

FIGS. 7*a* to 7*c* are views from three directions of one micro-reflector and around it, wherein representative light path P is depicted together, FIG. 7*a* being a view from +Z-direction, FIG. 7*b* being a view from +X-direction and FIG. 7*c* being a view from +Y-direction.

As shown in FIG. 6, a micro-reflector 90 is shaped like a block having four faces 91 to 94. The faces 91 to 94 are formed as to be inclined with respect to a general plane representing the back face 34, respectively. The faces 91 and 92 provide a guiding portion for inputting light smoothly, meeting each other at a ridge 96.

On the other hand, the faces 93 and 94 provide reflection surfaces which effect reflections twice for direction conversion to produce an inner output light. The faces 93 and 94 meet each other at a ridge 95. The faces 91 and 93 meet each other at a ridge 97 and the faces 92 and 94 meet each other at a ridge 98.

Referring to FIGS. 5 and 6 together, the reflection surfaces 93 and 94 provide a conversion output portion and it will be understood, viewing from the beam P, that the conversion output portion forms a valley. The ridge 95 gives the valley a bottom. The valley gets narrower and shallower according to an increasing distance from the guiding portions (See a and b). This configuration enables the above-mentioned double reflections to occur easily. As result, direction conversion of light occurs twice three-dimensionally to produce the inner output light Q directed to the emission face 33.

Viewing from the beam P, the reflection surfaces 91 and 92 of the guiding portion also form a valley. The ridge 96 gives this valley a bottom. This valley gets narrower and shallower according to an increasing distance from the conversion output portion.

It should be noted that a travelling direction of an inner output light Q can be controlled within a remarkable range by adjusting a direction of a micro-reflector 90 three-dimensionally. Each micro-reflector 90 has a three-dimensional direction degree of freedom of which is "3", being possible to be expressed by three independent direction parameters, θr, θx and θy, as shown in FIGS. 7*a* through 7*c*.

Parameter θr is "an angle at which a line produced by projecting a ridge portion 95 onto a XY-plane (parallel with a general plane representative of the extending direction of the back face 34) extends with respect to +Y-axis direction (a depth direction of the light guide plate 30 as viewed from the side of the incidence end face 32). A relative-angular distribution of inputting light to a micro-reflector 90 is mainly influenced by parameter θr. Parameter θr is preferably designed generally as to be zero degree or within a range such as from 0 to ±18 degrees.

In an example shown in FIGS. 4 and 5, the maximum input light quantity is obtained when θr is approximately 0 degree because light is supplied mainly form −Y-direction to almost all area in the back face 34 of the light guide plate 30. However, it brings no problem to adjust θr within a small range in order to three-dimensionally control a direction of an inner output light Q.

If parameter θr is too large, for example, greater than 45 degrees, the micro-reflector is apt to have a much reduced input light quantity, being generally not suitable for practical uses. However, it should be noted, as mentioned later, that angle θr may be adjusted in a special manner at locations receiving light from greatly inclined light coming directions, for example, at corner portions at both ends of the incidence end face 32.

In the next place, parameter θy is defined as "an angle at which a line produced by projecting a ridge portion 95 onto a YZ-plane (parallel with the side faces 35, 36) extends with respect to +Y-axis direction (a depth direction of the light guide plate 30 as viewed from the side of the incidence end face 32). A direction, regarding in a YZ-plane, of an output light Q is mainly influenced by parameter θy.

In this embodiment, an output light Q is directed as to be inclined with respect to XZ-plane (parallel with the incidence end face 32) at angle φ (φ>0 degree), as shown in FIG. 7*b*, in YZ-plane (perpendicular to the incidence end face 32) according to a feature of the present invention. Excessively small or excessively large inclination angle φ will cause the prism sheet PS to be hardly able to provide a direction-modified light directed to an approximately frontal direction. Further to this, excessively large inclination angle φ will increase light component which travels almost in parallel with the emission face 33, which is not preferable.

Considering such situation, a practical range of angle φ is from about 5 degrees to 40 degrees, preferably from about 10 degrees to 25 degrees. It should be noted, however, that another practical range of φ from about 25 degrees to 60 degrees, preferably from about 35 degrees to 50 degrees if alternatively the prism sheet PS is turned over and light R is inputted from the prismatic surface side.

The inner output light Q travels in a direction of angle φ and is emitted from the emission face 33 (a slope of a projection row PR) to become an emitted light R (See reference c). As mentioned above, the emitted light R is inputted to the input face PS1 (See reference d) and is direction-converted again, after travelling straight, toward an approximately frontal direction at outputting (See reference e).

A prismatic vertical angle of a projection row SR is chosen mainly under consideration of the direction of the output light Q. It should be noted, however, that a direction of the output light Q (accordingly that of the emitted light R) may be adjusted in design if a prismatic vertical angle of a projection row SR can not be set flexibly as mentioned previously. A direction of the output light Q can be controlled through adjusting angle θy. That is, a reduced angle θy gives an increased angle φ and an increased angle θy gives a reduced angle φ.

Further, parameter θx is defined as "an angle at which a line produced by projecting a ridge portion 95 onto a ZX-plane (parallel with the incidence end face 32) extends with respect to +Z-axis direction (a thickness direction of the light guide plate 30). A direction, regarding in a ZX-plane, of an output light Q is mainly influenced by parameter θx.

In the example shown in FIG. 7*c*, parameter θx is designed so that an emitted light R approximately frontal regarding in a ZX-plane is obtained after an inner incidence to one of the slopes SL1 of a projection PR at a small angle. The emitted light R becomes an output light S after transmitting the prism sheet PS.

In general, by adjusting the parameters, in particular θx, an inclination angle of face 93 with respect to a general plane representative of the back face 34 become unequal to an inclination angle of face 94 with respect to the general plane. For example, if the faces 93 and 94 are formed symmetrically with respect to the ridge portion 95, under a condition of θx≠0, the faces 93 and 94 have inclination angles different from each other with respect to the general plane representative of the back face 34.

Further discussion on operations of the projection rows PR is as follows. FIG. 7c shows a light path along which an inner output light Q is converted into an output illumination R directed to an approximately frontal direction, wherein output beams in practice distribute around the illustrated direction of the put light Q. FIG. 8 shows a typical light path of an inner output light Q1 directed to Z-direction regarding in a Zx-plane.

As illustrated, the inner output light Q1 is separated, on being inner-incident to the slope SL1, into a beam Q2 and a direct escaping light R1 depending on inner-incident angle. It is noted that total reflection occurs and no direct escaping light R1 is produced if the inner-incident angle is not smaller than the critical angle.

And, even if the inner-incident angle is smaller than the critical angle and some direct escaping light R1 is produced, there is generally a small difference between the inner-incident angle and the critical angle because the slope SL1 is inclined. For example, if the projections PR are made of PMMA (refractive index; 1.492), the critical angle is about 43 degrees.

An inner reflection beam Q2 is inner-incident to the other slope SL2. This causes the beam Q2 to be separated into a beam Q3 and beam Q4 depending on inner-incident angle. It is noted that total reflection occurs and the beam Q4 is not produced if the inner-incident angle is not smaller than the critical angle. Anyway, neither the beam Q3 nor Q4 becomes a direct escaping light. Although almost all of the beam Q4 goes out of the light guide plate 30 once, the beam Q4 is not regarded as a direct escaping light because almost of all of the beam Q4 impinges immediately to an adjacent projection and travels along paths quite different from the path of the beam R1. A great part of the beam Q4 becomes a beam Q5 which travels gain within the light guide plate 30.

A great part of various beams, produced in such ways, including Q3, Q5 and others similar to these can have again a chance of escaping from the projection rows PR after travelling along diverse paths. A part of the illumination light consists of beams which have succeeded in escaping to leave the light guide plate 30 at the second or later escaping chances.

It should be noted that somewhat a small quantity of light like Q3 and Q5 would be produced if the emission face 33 were a flat face without projection rows PR. It should be noted, however, that the inner output light Q1 is inclined in a plane perpendicular to the incidence end face 32 (See angle φ) will cause light like the above to be produced more easily as compared with a case where the inner output light Q1 is not inclined. Therefore, even if no projection row PR is formed on the emission face 33, light like beams Q3 or Q5 is produced in a remarkable proportion.

Anyway, an excessive quantity of direct escaping light is checked, causing fine unevenness in brightness to appear little.

In other words, any of two conditions, one being such that the inner output light Q has a propagation direction inclined at an adequate angle φ, for example in a range from about 10 degrees to about 25 degrees (if otherwise the prismatic face is directed to the output side, in a range from about 35 degrees to about 50 degrees) and another being such that the projection rows PR are formed on the emission face 33, brings an advantageous situation for regulating direct escaping light as to be produced not excessively and thereby avoiding fine unevenness in brightness or "feeling of glaring" from appearing.

This effect of the projection rows is expected to vary variously depending on not only inclination angles of the slopes SL1, SL2 but also other factors such as configuration (in particular, configuration of each valley of each conversion output portion), size and direction (θr, θy, θx) of each micro-reflector 90, and material (refractive index) of which light guide plate 30 is made. Therefore, the optimum condition is preferably determined in designing.

In the last place, variations of arraying pattern of micro-reflectors are described as follows. Although the present invention requires no absolute condition on arraying pattern of micro-reflectors 90, the micro-reflectors 90 are arrayed preferable so that a uniform brightness distribution is realized overall on the emission face 33.

Figure 9:
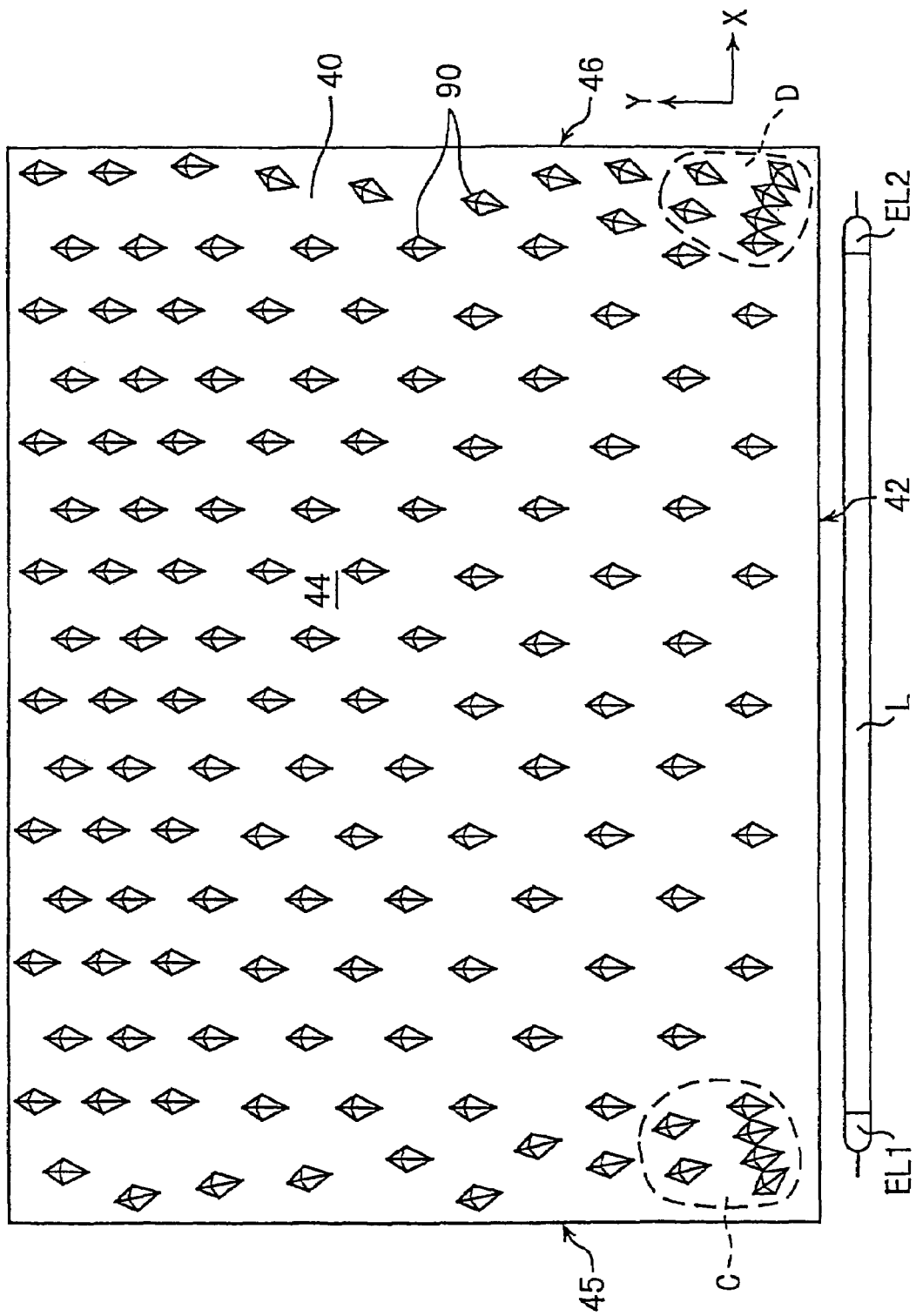
FIG. 9 illustrates an example of micro-reflector arraying.

FIG. 9 illustrates an example of array of micro-reflectors. Referring to FIG. 9, an incidence end face 42 is provided by a side end face of a light guide plate 40 made of a transparent resin. A great number of micro-reflectors 90 are arrayed on a back face 44 which is provided by a major face. The other major face provides an emission face (not shown), and right and left minor faces provide side faces 45 and 46.

Figure 1A:
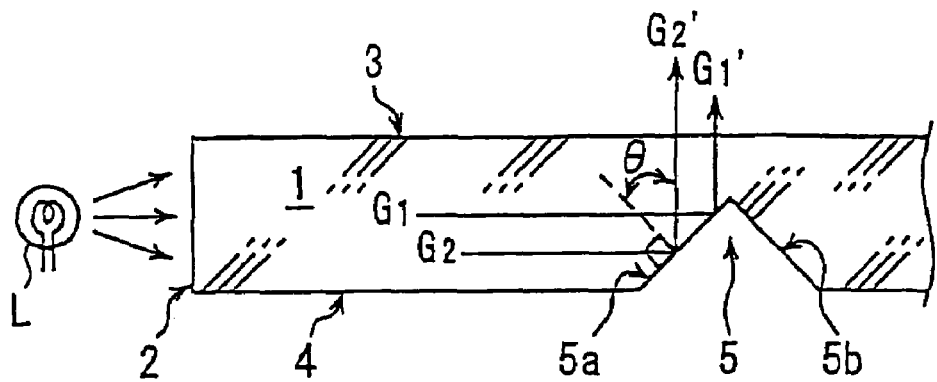
FIG. 1a illustrates a known principle of edge-lighting.
Figure 1B:
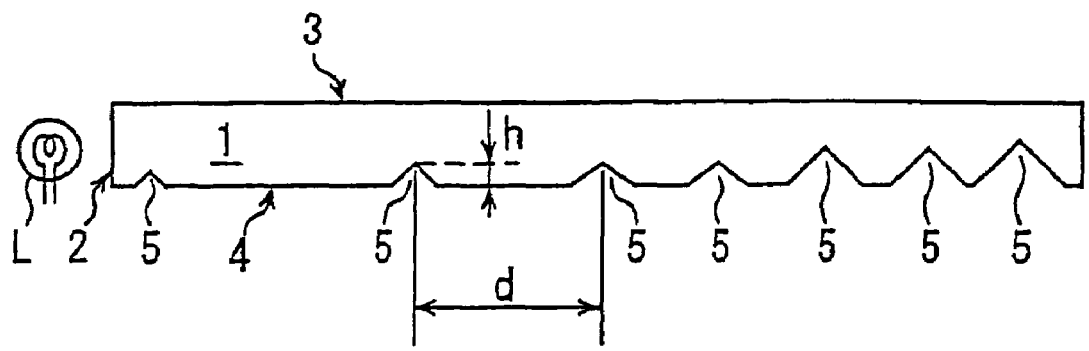
FIG. 1b illustrates a known formation of recess.
Figure 1C:
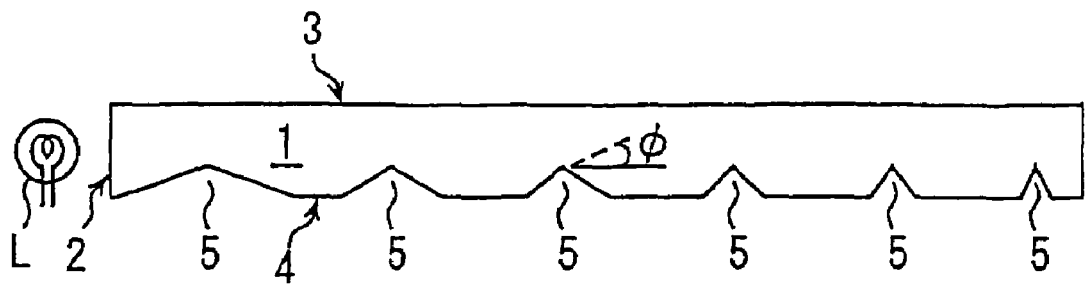
FIG. 1c illustrates another known formation of recess.
Figure 2:
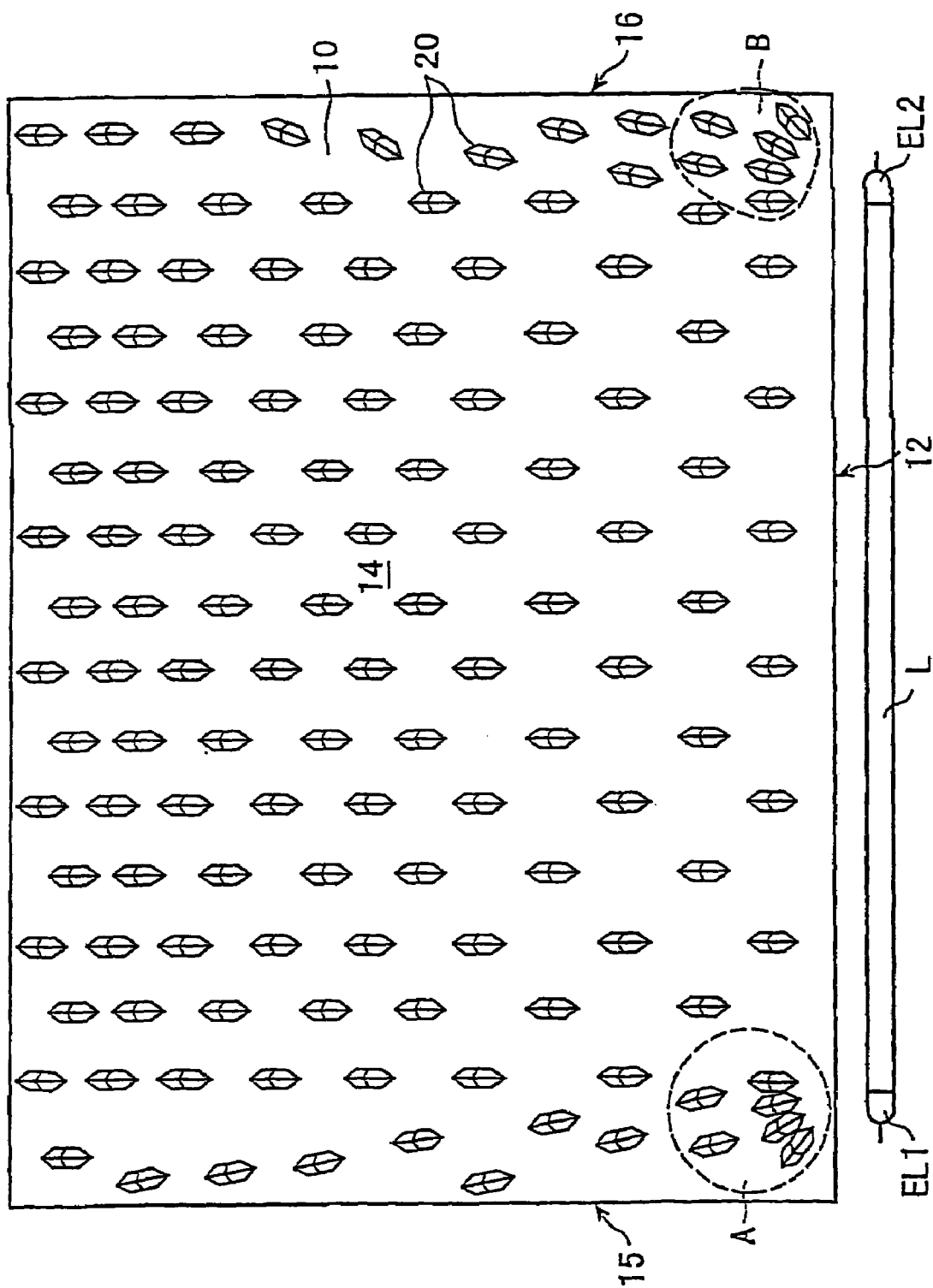
FIG. 2 is a plan view illustrating a back face of a light guide plate employed in a surface light source device in accordance with a prior invention.

A primary light source (cold cathode lamp) L is the same one as shown in FIG. 2, being disposed along the incidence end face 42 to supply light thereto. Both ends of the cold cathode lamp L are electrode portions EL1 and EL2 having no emission ability between which an emitting portion extends with length L somewhat shorter than that of the incidence end face 42. An arrangement designed in such a way is employed very often in order to avoid the electrode portions EL1 and EL2 from sticking out.

The primary light source emits light which is introduced into the light guide plate 40 through the incidence end face 42. On the way of propagation within the light guide plate 40, a beam enters a micro-reflector 90 to be reflected generally twice, with the result that an inner output light directed to the emission face 33 is produced. Some of the inner output light becomes a direct escaping light and some of the other becomes an indirect escaping light. Detailed configurations and functions of individual micro-reflectors 90 are omitted because of being described already.

An arraying pattern shown in FIG. 9 is the same as one shown in FIG. 2. However, orientations (directions) of the individual micro-reflectors 90 have a degree of freedom (direction parameters θr, θx, θy) as forementioned. It is noted that details of micro-reflectors' directions are not expressed in the illustration. However, it is shown that parameter θr is equal to about 0 degree except in corner portions C and D.

As forementioned, all or a part of the micro-reflectors may have orientations expressed by parameter θr which are rotated clockwise or anticlockwise by a small angle ranging from several degrees to 20 degrees, for example 18 degrees, with respect to the individual orientations shown.

The illustrated array is subject to the following arraying rules.

1. Formation density (covering rate) tends to increase with an increasing distance from the incidence end face 42. This prevents brightness from varying on the emission face depending on distance from the incidence end face 42.

2. In the corner areas C and D near to the electrode portion EL1 or EL2, micro-reflectors 90 are arrayed at a particularly large density. This, together with the following orientation condition 4, prevents dark regions from appearing in the corner areas C and D.

3. In almost of all of the back face 44, micro-reflectors 90 are orientated as to align to a direction approximately perpendicular to the incidence end face 42 as foredescribed (θr=about 0 degree).

4. In the corner areas C and D, micro-reflectors 90 are orientated as to be much inclined with respect to the incidence end face 42. That is, parameter θr ranges up to about 45 degrees at the maximum. This causes orientations of micro-reflectors 90 to correspond to light coming directions, thereby providing an increased direction conversion efficiency. However, as forementioned, it is noted that all or a part of the micro-reflectors 90 may have orientations expressed by parameter θr which are rotated clockwise or anticlockwise by a small angle ranging from several degrees to 20 degrees, for example 18 degrees, with respect to the illustrated individual orientations.

5. Arraying of the micro-reflectors 90 is designed as to avoid having a striking regularity such that many micro-reflectors just align to a straight line. This renders the micro-reflectors 90 more inconspicuous. And this prevents also Moire stripes which could be caused by an overlapping relation with a matrix-like electrode array when the device is incorporated in a LCD.

Figure 10:
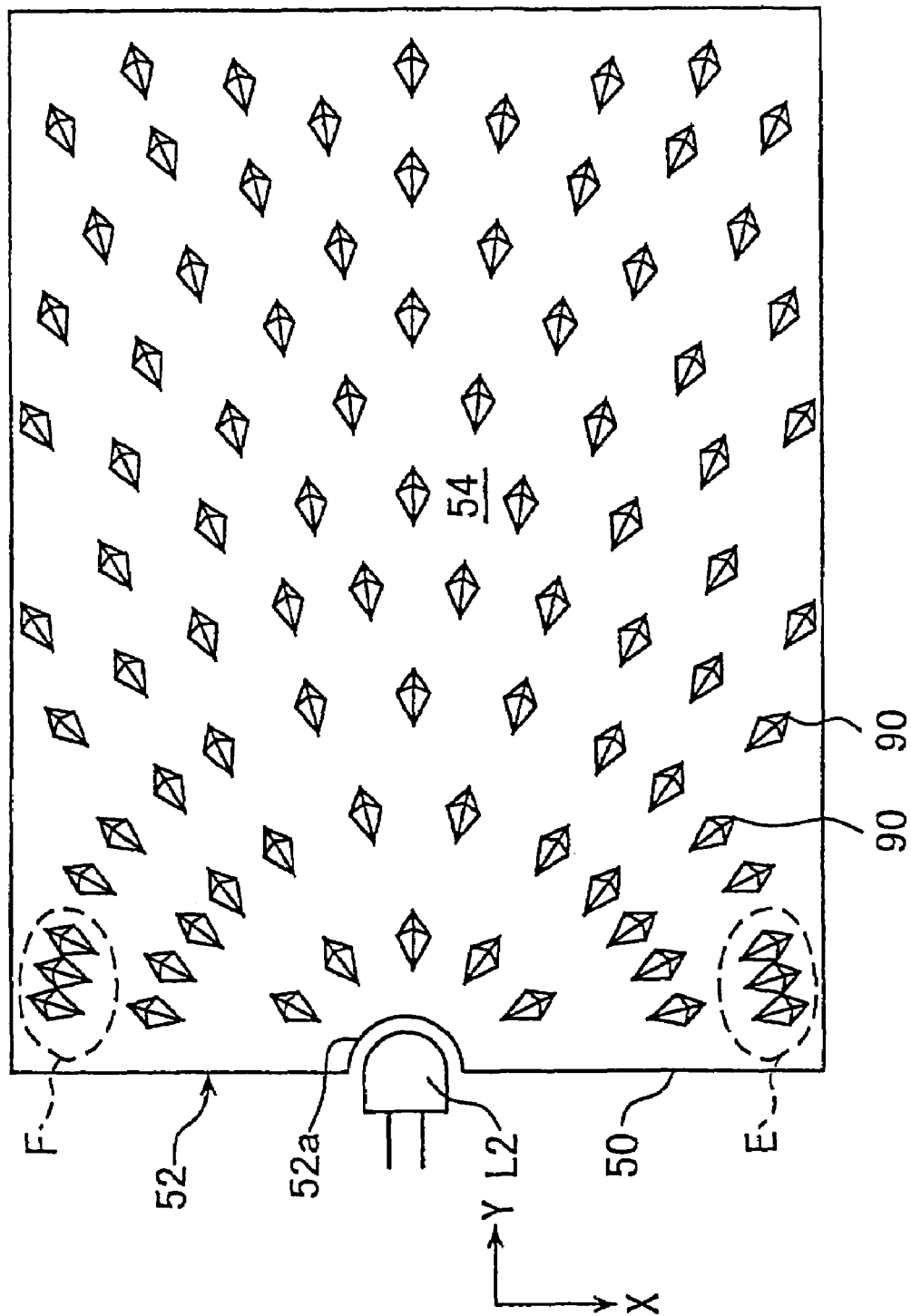
FIG. 10 illustrates another example of micro-reflector arraying.

FIG. 10 illustrates another example of array of micro-reflectors 90. This example shown in FIG. 10 is suitable for cases where a primary light source utilizing a point-like light emitting element such as LED is employed.

As shown in FIG. 10, an incidence end face is provided by a dent 52a formed at a center portion of a side end face 52 of a light guide plate 50. A primary light source L2 is a non-rod-type one which utilizes a LED (Light Emitting Diode) and have a small emitting area, being disposed to supply light to the light guide plate through the dent 52a.

A great number of micro-reflectors 90 are arrayed on a back face 54. The micro-reflectors are arrayed and orientated according to the following features.

1. Covering rate tends to increase with an increasing distance from the dent 52a. This prevents brightness from varying on the emission face depending on distance from the dent 52a (or the light source L2).

2. Micro-reflectors 90 are orientated radially with respect to the dent 52a over the back face 54. Guiding portions are directed to the dent 52a. In other words, ridge portions 95 of conversion output portions of micro-reflectors 90 (FIGS. 6 and 7) extend in directions directed to the dent 52a. It is noted, however, that all or a part of the micro-reflectors may have orientations (expressed by parameter θr in FIG. 7), which are rotated clockwise or anticlockwise by a small angle ranging from several degrees to 20 degrees, for example 18 degrees, with respect to the illustrated individual orientations, as described above.

3. If the light source L2 has an emitting directivity to a frontal direction, covering rate of micro-reflectors 90 may be increased around side end faces 52. In particular, corner areas E and F is preferably provided with a heightened covering rate.

4. The micro-reflectors 90 is arrayed as to avoid having a striking regularity such that many micro-reflectors just align to a straight line. This renders the micro-reflectors 90 more inconspicuous. And this prevents also Moire stripes which could be caused by an overlapping relation with a matrix-like electrode array when the device is incorporated in a LCD.

Figure 11:
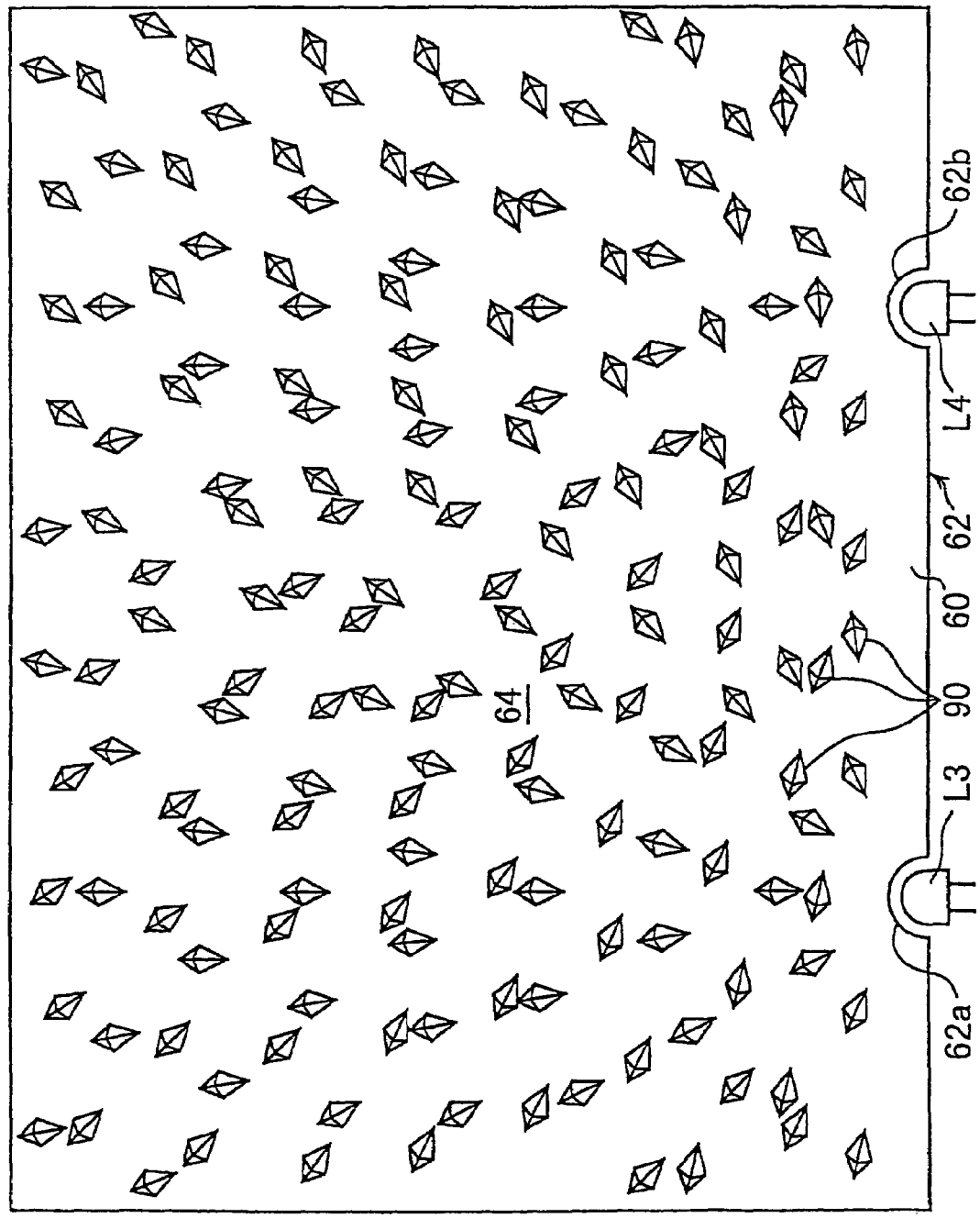
FIG. 11 illustrates still another example of micro-reflector arraying; and,
FIG. 12 illustrates an example of micro-reflector arraying other than shown in FIGS. 9 to 11.

FIG. 11 illustrates still another example of array of micro-reflectors 90. This example shown in FIG. 11 is suitable for cases where primary light sources utilizing a point-like light emitting element such as LED are disposed at two positions.

As shown in FIG. 11, incidence end faces are provided by two dents 62a and 62b formed on a side end face 62 of a light guide plate 60. Primary light sources L3 and L4 are non-rod-type ones each of which utilizes LED (Light Emitting Diode) and have a small emitting area, being disposed to supply light to the light guide plate through the dents 62a and 62b, respectively.

A great number of micro-reflectors 90 are arrayed on a back face 64. The micro-reflectors are arrayed and orientated according to the following features.

1. Covering rate and orientation are designed as to avoid a brightness variation from appearing on the emission face, with relations with positions of dents 62a and 63b being considered.

In the first place, a distribution (called Distribution 3) of covering rate and orientation is designed as to achieve a uniform brightness over the emission face under a provision that light is supplied from only one light source L3.

In the second place, another distribution (called Distribution 4) of covering rate and orientation is designed as to achieve a uniform brightness over the emission face under another provision that light is supplied from only the other light source L4.

Distribution 4 is added to Distribution 4 to obtain a piled distribution (called Distribution 3+Distribution 4) of covering rate and orientation, which is employed in this example.

While covering rate according to Distribution 3 tends to increase with an increasing distance from the light source L3, covering rate according to Distribution 4 tends to increase with an increasing distance from the light source L4. Accordingly, as a whole, gradients of Distribution 3 and Distribution 4 tends to be cancelled by each other. In the illustrated example, a roughly uniform covering rate is shown.

A half of the micro-reflectors 90 are orientated radially with respect to the dent 62a according to Distribution 3 and the other half of are orientated radially with respect to the dent 62b according to Distribution 4.

Figure 7:
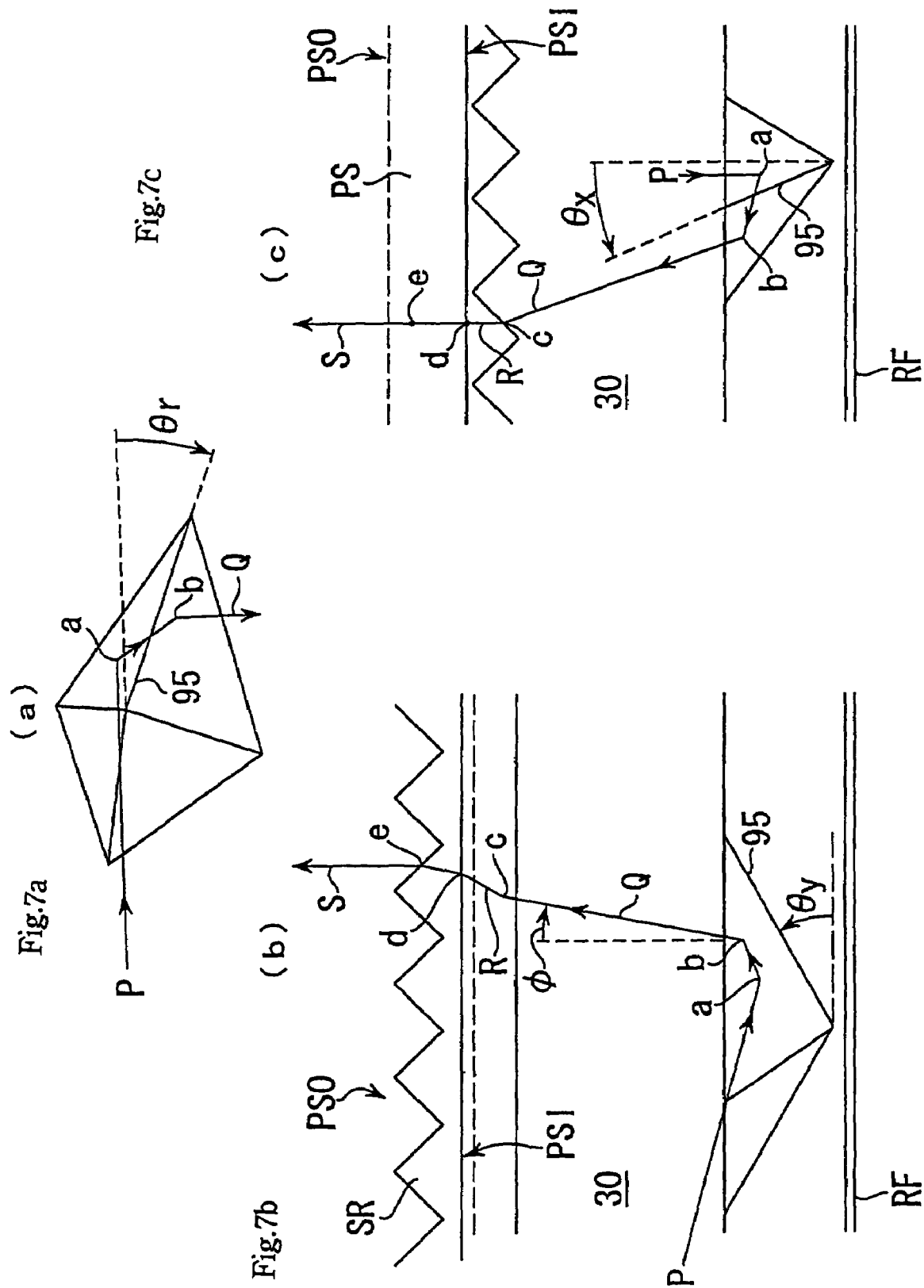
FIG. 7a is a view from +Z-direction of one micro-reflector and around it, wherein representative light path P is depicted together.
FIG. 7b is a view from +X-direction of the same micro-reflector and around it, wherein representative light path P is depicted together.
FIG. 7c is a view from +Y-direction of the same micro-reflector and around it, wherein representative light path P is depicted together.
Figure 8:
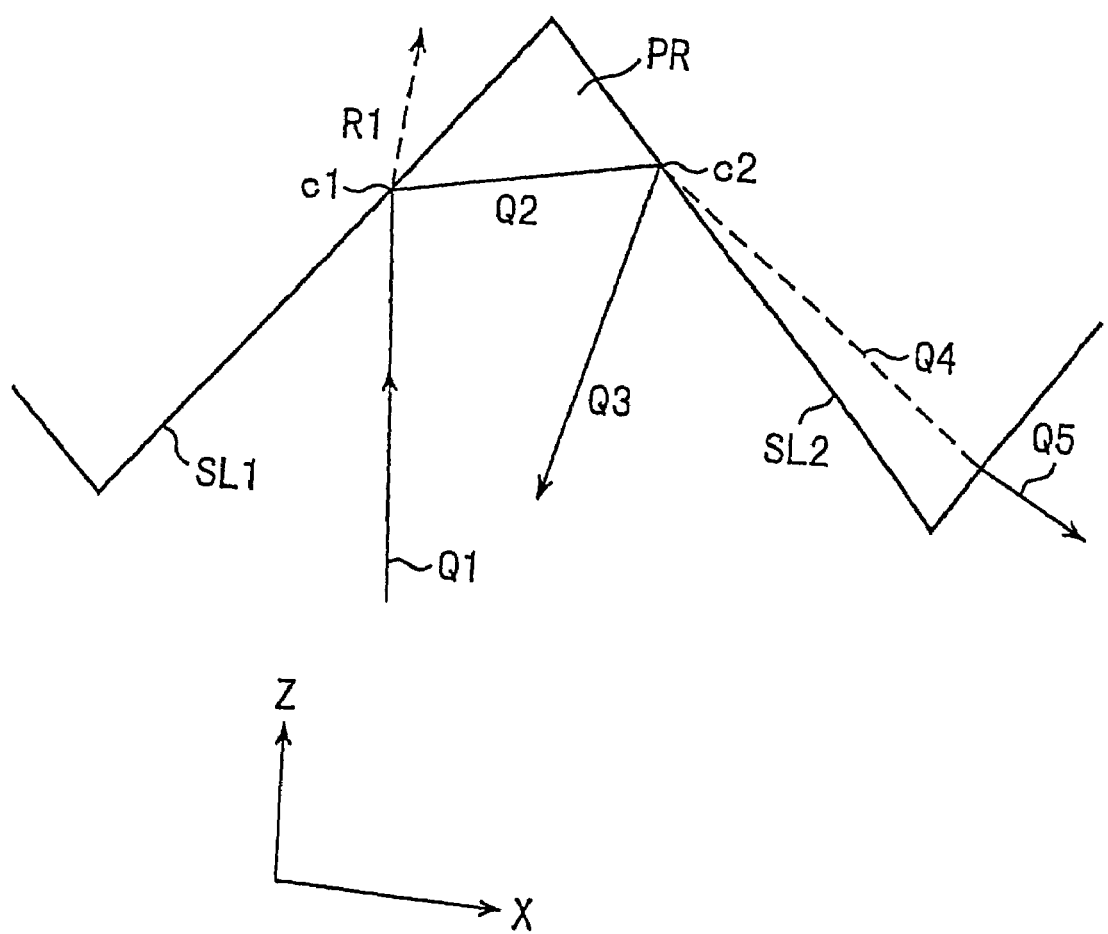
FIG. 8 illustrates exemplarily a typical light path of inner output light Q1 that propagates toward Z-direction regarding in XZ plane in order to explain effects of projection rows formed on an emission face of the light guide plate.

It is noted, however, that all or a part of the micro-reflectors may have orientations, expressed by parameter θr in FIG. 7, which are rotated clockwise or anticlockwise by a small angle ranging from several degrees to 20 degrees, for example 18 degrees, with respect to the illustrated individual orientations, as forementioned.

2. The micro-reflectors 90 is arrayed as to avoid having a striking regularity such that many micro-reflectors just align on a straight line. This renders the micro-reflectors 90 more inconspicuous. And this prevents also Moire stripes which could be caused by an overlapping relation with a matrix-like electrode array when the device is incorporated in a LCD.

Figure 12:
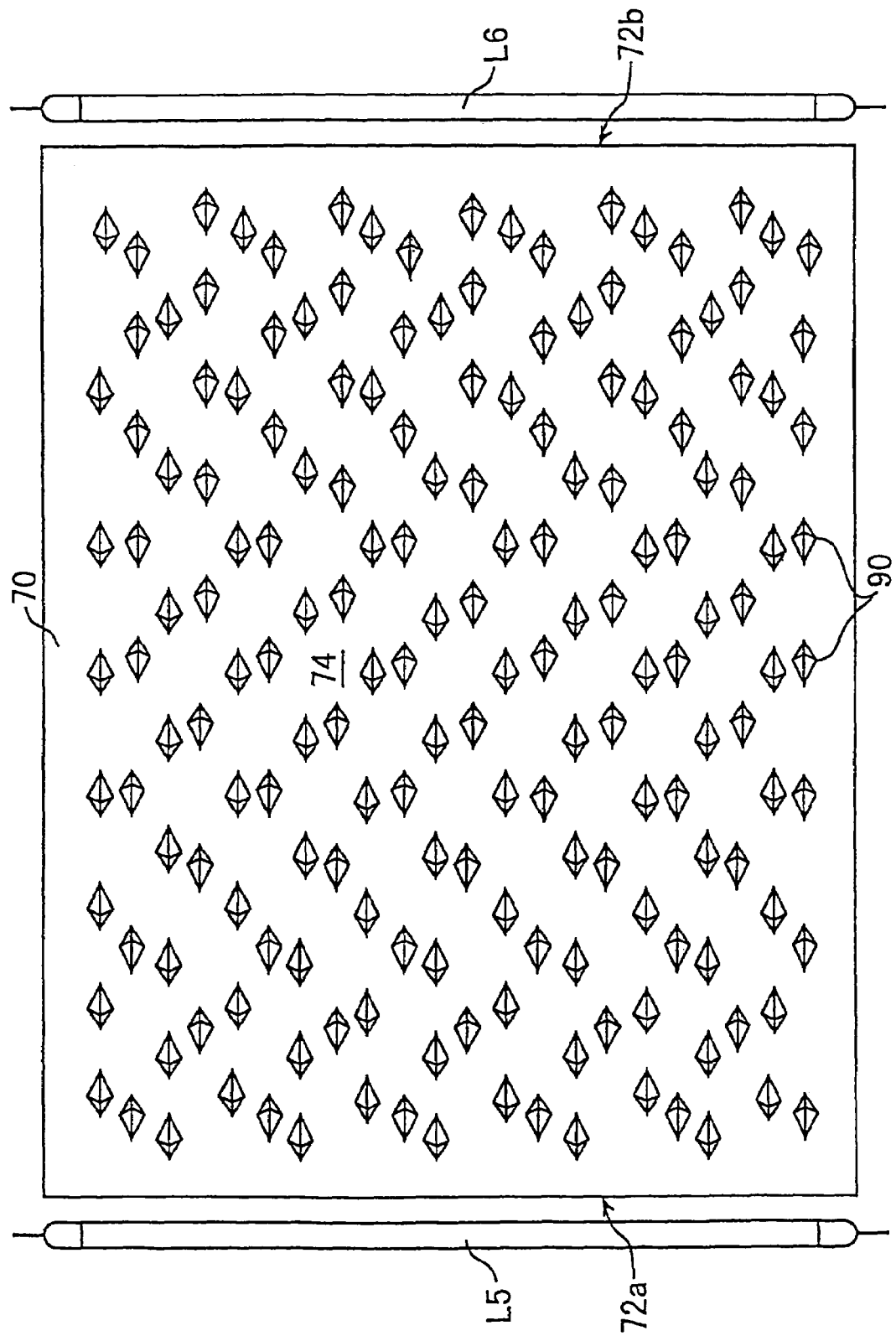

FIG. 12 illustrates still one more example of array of micro-reflectors 90. An application to a so-called two-lamp-arrangement is shown in FIG. 12. An employed light guide plate 70 has incidence end faces 72a and 72b provided by a pair of minor faces parallel with each other.

Rod-like primary light sources (cold cathode lamps) L5 and L6 are disposed along the incidence end faces 72a and 72b to supply light thereto, respectively. A great number of micro-reflectors 90 are arrayed on a back face 74. The micro-reflectors are arrayed and orientated according to the following features.

1. Covering rate and orientation are designed as follows. In the first place, a distribution (called Distribution 5) of covering rate and orientation is designed as to achieve a uniform brightness over the emission face under a provision that light is supplied from only one light source L5.

In the second place, another distribution (called Distribution 6) of covering rate and orientation is designed as to achieve a uniform brightness over the emission face under another provision that light is supplied from only the other light source L6.

Distribution 5 is added to Distribution 6 to obtain a piled distribution (called Distribution 5+Distribution 6) of covering rate and orientation, which is employed in this example.

While covering rate according to Distribution 5 tends to increase with an increasing distance from the emission end face 72*a*, covering rate according to Distribution 6 tends to increase with an increasing distance from the incidence end face 72*b*. Accordingly, as a whole, gradients of Distribution 5 and Distribution 6 tends to be cancelled by each other. In the illustrated example, a roughly uniform covering rate is shown.

The micro-reflectors 90 are orientated in a direction generally perpendicular to the incidence end faces 72*a* and 72*b*. It is noted that guiding portions of micro-reflectors according to Distribution 5 are directed to the incidence end face 72*a* and guiding portions of micro-reflectors according to Distribution 6 are directed to the incidence end face 72*b*.

It is also noted, however, that all or a part of the micro-reflectors may have orientations, expressed by parameter θr in FIG. 7, which are rotated clockwise or anticlockwise by a small angle ranging from several degrees to 20 degrees, for example 18 degrees, with respect to the illustrated individual orientations, as forementioned.

Usually, the primary light sources L5 and L6 have an equal power to each other and a half of the micro-reflectors are directed to the incidence end face 72*a* and the other half are directed to the incidence end face 72*b*.

2. The micro-reflectors 90 is arrayed as to avoid having a striking regularity such that many micro-reflectors just align on a straight line. This renders the micro-reflectors 90 more inconspicuous. And this prevents also Moire stripes which could be caused by an overlapping relation with a matrix-like electrode array when the device is incorporated in a LCD.

As described above, according to the present invention, not only an effective direction conversion is achieved within a light guide plate based on a twice-occurring-reflection function of micro-reflectors distributed on a back face of the light guide plate but also direct escaping of light at an emission face is regulated. Therefore, a light guide plate, surface light source device and liquid crystal display free from a fine unevenness in brightness are obtained.

Further saying, a natural direction conversion is performed over the surface light source device, an emission face of which easily prevent much light from travelling almost along and close to the emission face, because an obliquely directed inner output light is produced once and then incorporated with a prism sheet to provide an approximately frontal illumination output.

A still another merit is that both prism sheet and micro-reflector have degrees of freedom for designing.

Needless to say, these merits are maintained generally if a surface light source device improved in accordance with the present invention is applied to an arrangement for illuminating a LCD panel of a liquid crystal display. That is, a bright and clear display screen is provided. And the surface light source device as a part of the LCD allows to be designed without difficulty.

What is claimed is:

1. A surface light source device comprising:
   at least one primary light source;
   a light guide plate having two major faces to provide an emission face, a back face and an incidence end face for introducing light supplied by said primary light source; and
   a direction modifying member disposed along said emission face,
   wherein said back face is provided with a great number of projection-like micro-reflectors for direction-conversion of light, each of which has a guiding portion and a conversion output portion that includes a ridge portion and a pair of first and second reflection surfaces formed on both sides of the ridge portion respectively as to be inclined with respect to a general plane representative of said back face,
   said ridge portion and said first and second reflection surfaces forming a valley in each of said micro-reflectors,
   said valley getting narrower and shallower as being distant from the guiding portion so that an inner input light reaching the valley via the guiding portion is reflected by one of the first and second reflection surfaces and is further reflected by the other of the first and second reflection surfaces as to produce an inner output light having a main propagation direction that is inclined with respect to a frontal direction in a plane perpendicular to said incidence end face so as to get remote from said incidence end face, and
   said direction modifying member receives the inner output light emitted from said emission face as an input and provides an output light that is approximately directed to the frontal direction in a plane perpendicular to said incidence end face.

2. A surface light source device as defined in claim 1, wherein said first and second reflection surfaces are different from each other in inclination angle with respect to said general plane representative of said back face.

3. A surface light source device as defined in claim 2,
   wherein said emission face is provided with a great number of projection rows running approximately at right angles with respect to said incidence end face, and
   wherein said projection rows have an inner reflection function which controls a direct escaping of the inner out put from said emission face.

4. A surface light source device as defined in claim 2, wherein a reflection member is disposed along said back face.

5. A surface light source device as defined in claim 1, wherein said ridge extends in a direction which varies depending on position on said back face as to approximately accord with a light coming direction.

6. A surface light source device as defined in claim 5,
   wherein said emission face is provided with a great number of projection rows running approximately at right angles with respect to said incidence end face, and
   wherein said projection rows have an inner reflection function which controls a direct escaping of the inner out put from said emission face.

7. A surface light source device as defined in claim 5, wherein a reflection member is disposed along said back face.

8. A surface light source device as defined in claim 1, wherein said ridge extends in a direction which varies depending on position on said back face as to be inclined at a small angle with respect to a light coming direction.

9. A surface light source device as defined in claim 8,
   wherein said emission face is provided with a great number of projection rows running approximately at right angles with respect to said incidence end face, and
   wherein said projection rows have an inner reflection function which controls a direct escaping of the inner out put from said emission face.

10. A surface light source device as defined in claim 9, wherein a reflection member is disposed along said back face.

11. A surface light source device as defined in claim 8, wherein a reflection member is disposed along said back face.

12. A surface light source device as defined in claim 1,
    wherein said emission face is provided with a great number of projection rows running approximately at right angles with respect to said incidence end face, and wherein said projection rows have an inner reflection function which controls a direct escaping of the inner out put from said emission face.

13. A surface light source device as defined in claim 1, wherein a reflection member is disposed along said back face.

14. A liquid crystal display comprising:

a liquid crystal display panel; and a surface light source device for illuminating said liquid crystal display panel, said surface light source device having at least one primary light source, a light guide plate having two major faces to provide an emission face, a back face and an incidence end face for introducing light supplied by said primary light source and a direction modifying member disposed along said emission face, wherein said back face is provided with a great number of projection-like micro-reflectors for direction-conversion of light, each of which has a guiding portion and a conversion output portion that includes a ridge portion and a pair of first and second reflection surfaces formed on both sides of the ridge portion respectively as to be inclined with respect to a general plane representative of said back face, said ridge portion and said first and second reflection surfaces forming a valley in each of said micro-reflectors, said valley getting narrower and shallower as being distant from the guiding portion so that an inner input light reaching the valley via the guiding portion is reflected by one of the first and second reflection surfaces and is further reflected by the other of the first and second reflection surfaces as to produce an inner output light having a main propagation direction that is inclined with respect to a frontal direction in a plane perpendicular to said incidence end face so as to get remote from said incidence end face, and said direction modifying member receives the inner output light emitted from said emission face as an input and provides an output light that is approximately directed to the frontal direction in a plane perpendicular to said incidence end face.

15. A liquid crystal display as defined in claim 14, wherein said first and second reflection surfaces are different from each other in inclination angle with respect to said general plane representative of said back face.

16. A liquid crystal display defined in claim 15, wherein said emission face is provided with a great number of projection rows running approximately at right angles with respect to said incidence end face, and wherein said projection rows have an inner reflection function which controls a direct escaping of the inner out put from said emission face.

17. A liquid crystal display as defined in claim 15, wherein a reflection member is disposed along said back face.

18. A liquid crystal display as defined in claim 14, wherein said ridge extends in a direction which varies depending on position on said back face as to approximately accord with a light coming direction.

19. A liquid crystal display as defined in claim 18, wherein said emission face is provided with a great number of projection rows running approximately at right angles with respect to said incidence end face, and wherein said projection rows have an inner reflection function which controls a direct escaping of the inner out put from said emission face.

20. A liquid crystal display as defined in claim 18, wherein a reflection member is disposed along said back face.

21. A liquid crystal display as defined in claim 14, wherein said ridge extends in a direction which varies depending on position on said back face as to be inclined at a small angle with respect to a light coming direction.

22. A liquid crystal display as defined in claim 21, wherein said emission face is provided with a great number of projection rows running approximately at right angles with respect to said incidence end face, said projection rows have an inner reflection function which controls a direct escaping of the inner out put from said emission face.

23. A liquid crystal display as defined in claim 22, wherein a reflection member is disposed along said back face.

24. A liquid crystal display as defined in claim 21, wherein said emission face is provided with a great number of projection rows running approximately at right angles with respect to said incidence end face, and wherein said projection rows have an inner reflection function which controls a direct escaping of the inner out put from said emission face.

25. A liquid crystal display as defined in claim 21, wherein a reflection member is disposed along said back face.

26. A liquid crystal display as defined in claim 14, wherein said emission face is provided with a great number of projection rows running approximately at right angles with respect to said incidence end face, and wherein said projection rows have an inner reflection function which controls a direct escaping of the inner out put from said emission face.

27. A liquid crystal display as defined in claim 14, wherein a reflection member is disposed along said back face.

* * * * *

UNITED STATES PATENT AND TRADEMARK OFFICE
CERTIFICATE OF CORRECTION

| | |
|---|---|
| PATENT NO. | : 7,394,107 B2 |
| APPLICATION NO. | : 11/270623 |
| DATED | : July 1, 2008 |
| INVENTOR(S) | : Shingo Ohkawa |

It is certified that error appears in the above-identified patent and that said Letters Patent is hereby corrected as shown below:

Title Page, Column 1 Item [56] (Foreign Patent Documents), Line 3, change
"JP    10-2064849    8/1998" to
--JP    10-206849    8/1998--.

Column 19, Line 47 Claim 16, after "display" insert --as--.

Signed and Sealed this

Eighteenth Day of November, 2008

JON W. DUDAS
*Director of the United States Patent and Trademark Office*